United States Patent [19]

MacGowan et al.

[11] Patent Number: 4,731,786

[45] Date of Patent: Mar. 15, 1988

[54] METHOD AND APPARATUS FOR PRODUCING DURATIONALLY SHORT ULTRAVIOLET OR X-RAY LASER PULSES

[75] Inventors: Brian J. MacGowan, Livermore; Dennis L. Matthews, El Granada; James E. Trebes, Livermore, all of Calif.

[73] Assignee: The United States of America as represented by the United States Department of Energy, Washington, D.C.

[21] Appl. No.: 46,020

[22] Filed: May 5, 1987

[51] Int. Cl.⁴ .................................................. H01S 3/30
[52] U.S. Cl. ........................................ 372/5; 372/103; 372/70; 372/9; 372/25
[58] Field of Search ................... 372/5, 25, 103, 70, 372/9

[56] References Cited

U.S. PATENT DOCUMENTS

| 4,612,641 | 9/1986 | Corkum | 372/25 |
| 4,646,308 | 2/1987 | Kafka et al. | 372/25 |

Primary Examiner—Leon Scott, Jr.
Attorney, Agent, or Firm—L. E. Carnahan; Gary Roth; Judson R. Hightower

[57] ABSTRACT

A method and apparatus is disclosed for producing ultraviolet or X-ray laser pulses of short duration (32). An ultraviolet or X-ray laser pulse of long duration (12) is progressively refracted, across the surface of an opaque barrier (28), by a streaming plasma (22) that is produced by illuminating a solid target (16, 18) with a pulse of conventional line focused high power laser radiation (20). The short pulse of ultraviolet or X-ray laser radiation (32), which may be amplified to high power (40, 42), is separated out by passage through a slit aperture (30) in the opaque barrier (28).

8 Claims, 2 Drawing Figures

METHOD AND APPARATUS FOR PRODUCING DURATIONALLY SHORT ULTRAVIOLET OR X-RAY LASER PULSES

The U.S. Government has rights in this invention pursuant to Contract No. W-7405-ENG-48 between the U.S. Department of Energy and the University of California for the operation of the Lawrence Livermore National Laboratory.

BACKGROUND OF THE INVENTION

The invention described herein relates generally to methods and apparatus for laser pulse compression, and more particularly to methods and apparatus for producing UV, VUV, or X-ray laser pulses of very short duration, and especially to methods and apparatus for producing such laser pulses having high power.

There is a need for the production of very short laser pulses in many areas of science and technology. This need extends to laser pulses of short wavelength. For example, temporally short UV or VUV laser pulses can be beneficially used in the fields of plasma physics and multiphoton chemistry, and the pulsed X-ray laser holography of living cells has been proposed. In this last application it is believed that the heating caused by the incident X-ray laser pulse will cause a thermal molecular motion that will smear the details of the measurement, if the X-ray laser pulse is of a duration longer than about 20 picoseconds. Unfortunately, the conventional methods for shortening laser pulses, such as those employing pockels cells or opto-acoustic modulators, rapidly lose their utility at wavelengths shorter than ultraviolet.

A means for modulating or controlling the positioning of laser output is disclosed by Mego, Jr. et al, in U.S. Pat. No. 3,975,692 issued Aug. 17, 1976. The invention comprises the introduction of a fluidic jet or a flowing liquid stream, preferably of dichlorodifluoromethane, either into the optical path within a laser cavity, or into the optical path of a continuous wave laser beam. Because it is limited by the relatively slow velocities of fluidic jets and flowing liquid streams that slowly change with time, this method is not adaptable to the production of very short laser pulses, appreciably less than one nanosecond in duration. Also, the natural opacity of the materials comprising the jets and streams, makes the method unsuited for use at laser wavelengths in the ultraviolet to X-ray range.

A means of infrared pulse compression is disclosed by Corkum in U.S. Pat. No. 4,612,641 issued Sept. 16, 1986. In this process, an infrared optical pulse is chirped and then passed through a dispersing means, which causes pulse compression. This infrared technique does not have applicability at UV, and shorter, wavelengths.

An optical switching element for long wavelength, 10 micron radiation is taught by Bjorklund in U.S. Pat. No. 4,166,254 issued Aug. 28, 1979. The element is a diffraction grating formed from an array of color centers in an alkali halide crystal. The grating is switched, by an external pump laser, so that it transmits radiation of a certain wavelength when the color centers are in the ground state, and diffracts that radiation when the color centers are in an excited state.

Genack in U.S. Pat. No. 4,486,885, issued Dec. 4, 1984, describes a system for use with a long wavelength continuous wave $CO_2$ laser beam in which the phase of the coherent light is rapidly changed, as it impinges on an absorbing cell containing carbon dioxide, to produce a short amplified pulse of light.

The production of very short laser pulses in a synchronously pumped, continuous wave dye laser is treated by Mourou et al in U.S. Pat. No. 4,517,675 issued May 14, 1985. The laser medium is a mixture of a laser dye and a fast saturable absorber. The disclosed method is not applicable at ultraviolet and X-ray laser wavelengths.

Apparatus, for controlling the pulse shape of a laser pulse, comprising a plurality of Kerr-effect gates that are selectively triggered by a control laser pulse, is disclosed by Siebert in U.S. Pat. No. 4,061,985 issued Dec. 6, 1977. The nature of the physics involved in this scheme is not appropriate to ultraviolet to X-ray laser wavelengths.

It is presently recognized that the first operational laboratory X-ray laser is taught by Rosen et al in Physical Review Letters 54, 106 (1985), and experimentally demonstrated by Matthews et al in Physical Review Letters 54, 110 (1985). This seminal X-ray laser system is also fully disclosed by Campbell et al in U.S. patent application Ser. No. 676,338 filed Nov. 29, 1984. A related short wavelength laser, whose output extends into the EUV and X-ray region, is taught by Hagelstein in U.S. Pat. No. 4,589,113 issued May 13, 1986. The short wavelength laser pulses produced by these laser systems have durations on the order of a nanosecond. The prior art techniques of pulse compression, discussed in the preceeding paragraphs, have applicability to long wavelength laser pulses, but cannot be used to compress or shorten the duration of nanosecond time scale, very short wavelength laser pulses.

Thus, the problem remains of producing ultraviolet or X-ray laser pulses of duration in the picosecond range. It would especially be a significant advantage to produce high power ultraviolet or X-ray laser pulses having a duration in the picosecond range.

SUMMARY OF THE INVENTION

It is, therefore, an object of the invention to provide method and apparatus for short wavelength laser pulse shortening or compression.

Another object of the invention is to provide method and apparatus for producing ultraviolet or X-ray laser pulses having a duration as short as a single picosecond.

Yet another object of the invention is to provide method and apparatus for producing high power ultraviolet or X-ray wavelength laser pulses having a duration as short as a single picosecond.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and apparatus of this invention comprises illuminating a flat surfaced portion of a target, comprised of a solid structural material, with a pulse of line focused, high power laser radiation. The flat surfaced portion of the target should have an areal density of $10^{-5}$ gm/cm$^2$ or greater. The laser pulse should have a wavelength in the approximate range from 0.25 to 11 microns, a full width at half maximum amplitude in the approximate range from 10 picoseconds to 1 nanosecond, and a peak intensity of $10^{12}$ watts/cm$^2$ or greater. In this manner a streaming plasma is produced in the spatial region that is located generally along, but removed slightly outward from, the illuminated flat surface of the target. The free electron density of the streaming plasma approximately exponentially decreases in the direction that proceeds perpendicularly away from the flat surfaced portion of the target. The approximately exponential slope at first increases in steepness, and then gradually levels, as the illuminating pulse of laser radiation increases and then diminishes in intensity. When a nanosecond time scale, ultraviolet or X-ray laser pulse is directed along a straight line that passes axially through the spatial region within which the streaming plasma is being produced, the pulse is increasingly refracted away from the flat surfaced portion of the target as the free electron density profile of the plasma increases in steepness. Then, as the free electron density profile of the streaming plasma gradually levels, the temporally long, ultraviolet or X-ray laser pulse is decreasingly refracted back toward the straight line along which the pulse first entered the streaming plasma. By positioning an opaque barrier having an aperture at a spatial location where the ultraviolet or X-ray laser pulse can only pass through the aperture when it leaves the region of the streaming plasma proceeding in a single direction, the portion of the nanosecond time scale, ultraviolet or X-ray laser pulse that passes through the aperture becomes an ultraviolet or X-ray laser pulse of shortened duration.

When, as is preferred, the aperture in the opaque barrier is in the form of a slit having a width of approximately 100 microns, the shortened ultraviolet or X-ray laser pulse may have a temporal pulse length as short as a single picosecond.

By passing an ultraviolet or X-ray laser pulse, whose pulse length has been shortened by the methods and apparatus of this invention, through an ultraviolet or X-ray laser gain medium, the means of preparation of which are understood in the art, the pulse is amplified and becomes a high power ultraviolet or X-ray laser pulse of short duration.

If the shortened ultraviolet or X-ray laser pulse of the preceding paragraph, before amplification, is prepared by passage through a slit, in the opaque barrier described above, having a width of approximately 100 microns, as is preferred, the amplified high power ultraviolet or X-ray laser pulse can have a temporal pulse length as short as a single picosecond.

It is thus apparent that the benefits and advantages of this invention, as embodied and described herein, include the provision of method and apparatus for shortening the duration of ultraviolet or X-ray laser pulses to as little as a single picosecond. These benefits and advantages further include those attendant upon the provision of amplified, high power, ultraviolet or X-ray laser pulses having a duration as short as a single picosecond.

BRIEF DESCRIPTION OF THE DRAWINGS

The accompanying drawings, which are incorporated in and form a part of the specification, illustrate an embodiment of the invention and, together with the description, serve to explain the principles of the invention.

In the drawings.

DETAILED DESCRIPTION OF THE INVENTION

Figure 1:
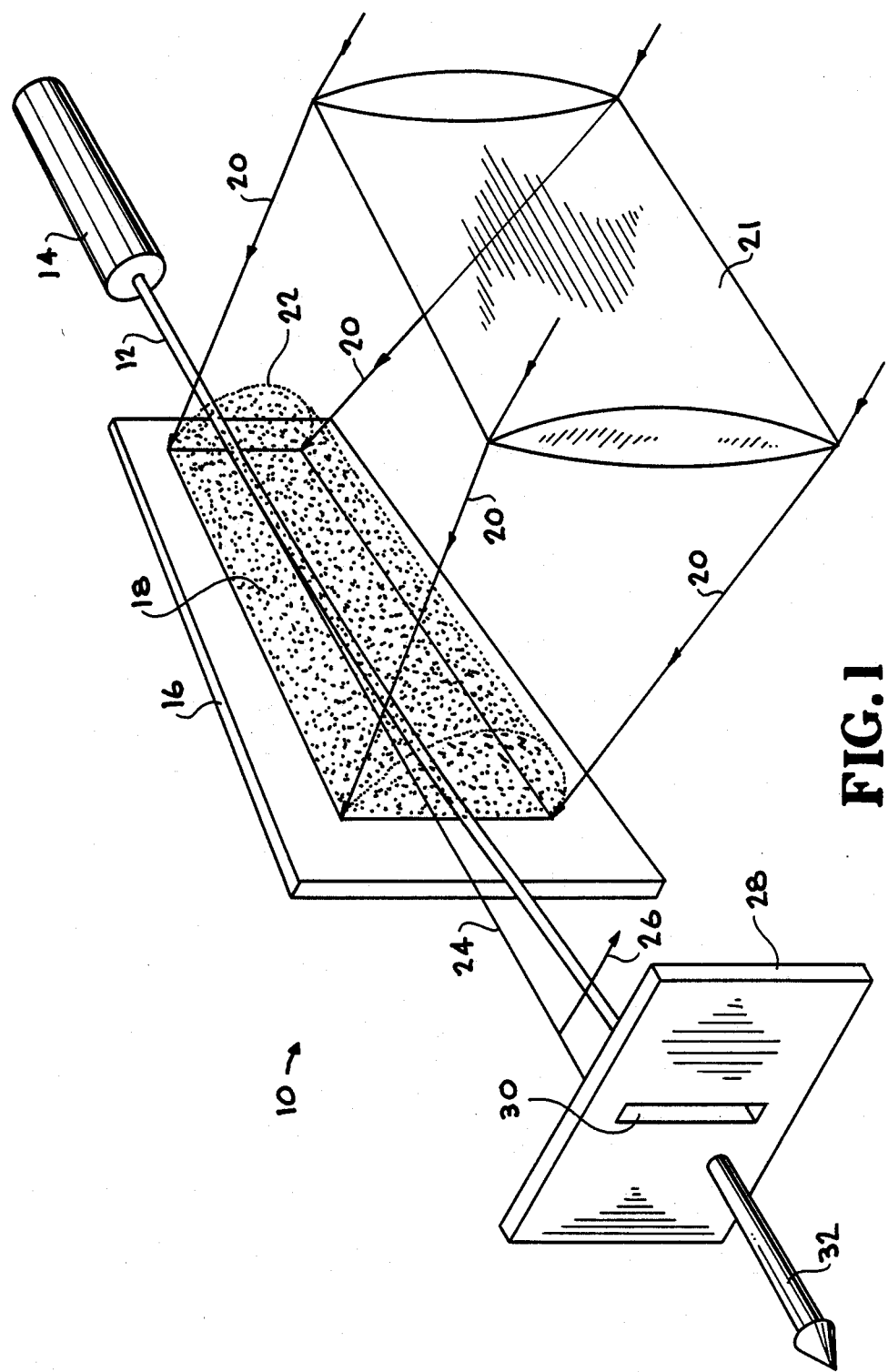
FIG. 1 is a schematic, perspective view of an apparatus for shortening the duration of a nanosecond time scale, ultraviolet or X-ray laser pulse, made in accordance with the invention.

References will now be made in detail to the present preferred embodiment of the invention, an example of which is illustrated in the accompanying drawings. Reference is first made to FIG. 1 which shows a schematic, perspective view of an apparatus, 10, that can shorten the duration of a nanosecond time scale, ultraviolet or X-ray laser pulse 12. Pulse 12 is provided by a means for providing a nanosecond time scale, ultraviolet or X-ray laser pulse 14, which is schematically indicated. Ultraviolet or X-ray laser pulses are presently routinely produced at laboratories throughout the world, and their means of production are well documented in the literature. For example, as mentioned above, the production of nanosecond time scale, ultraviolet or X-ray laser pulses is discussed by Rosen et al in Physical Review Letters 54, 106 (1985), Matthews et al in Physical Review Letters 54, 110 (1985), Campbell et al in U.S. patent application Ser. No. 676,338 filed Nov. 29, 1984, and Hagelstein in U.S. Pat. No. 4,589,113 issued May 13, 1986, to mention only a few reference sources treating this subject in great detail. In FIG. 1, means 14 is represented as a gain medium that can laser amplify ultraviolet or X-ray radiation along an approximately linear path. The ultraviolet or X-ray laser pulse 12 may be conceptually visualized, at any moment in time, as an object on the order of one foot long, since the speed of light is approximately one foot per nanosecond, and pulse 12 is a nanosecond time scale laser pulse.

Apparatus 10 comprises a target 16, that has a long and thin, generally rectangular and flat surfaced portion 18. The word target is very commonly used in the laser-related arts to refer to an object toward which laser radiation is directed. The flat surfaced portion 18 of target 16 has an areal density of $10^{-5}$ gm/cm$^2$ or greater and may be comprised of any solid structural material, without limitation. That is, flat surfaced portion 18 may be comprised of any metal, any plastic, any building material such as plaster, stone, paper, glass and so forth, or any other conceivable solid structural material such as ice, frozen mercury, or any combination of any of the above. The flat surfaced portion 18 is shown illuminated with a pulse 20 of line focused, high power laser radiation. The laser pulse 20, that is line focused by cylindrical lens 21, has a wavelength in the approximate range from 0.25 to 11 microns, a full width at half maximum amplitude in the approximate range from 10 picoseconds to 1 nanosecond, and a peak intensity in the focal plane of $10^{12}$ watts/cm$^2$ or greater. Laser pulses such as pulse 20 are supplied routinely by, for example, the NOVA laser of the Lawrence Livermore National Laboratory. The particular dimensions of rectangular surface 18 are not critical, and may change with various usage, however, a typical example is 0.02 centimeters wide by 1.0 centimeter long.

As the flat surfaced portion 18 of target 16 is illuminated by high power laser pulse 20, a streaming plasma 22, comprised of free electrons and ionized atoms blown-off from surface 18, is produced in the spatial region that is located generally along, but slightly removed outward from, flat surfaced portion 18, as shown in FIG. 1. It is precisely because the particular composition of plasma 22 is not critical to the performance of this invention, that surface 18 may be comprised of any solid structural material, without limitation. Since the streaming plasma 22 is comprised of material blown from the surface of the flat surface 18 of target 16 by high power laser pulse 20, the free electron density of the expanding plasma 22 is always highest near surface 18, diminishing at distances farther from surface 18. In other words, the free electron density of streaming plasma 22 approximately exponentially decreases in the direction perpendicularly proceeding away from surface 18. The approximately exponential slope at first increases in steepness, and then gradually levels, as the intensity of laser pulse 20 at first increases and then decreases.

Target 16 is positioned so that the nanosecond time scale, ultraviolet or X-ray laser pulse 12 initially proceeds along a straight line 24 that passes axially through the spatial region within which streaming plasma 22 is produced. Thus, laser pulse 12 will be refracted by the free electrons that comprise plasma 22. As derived in the book "Classical Electricity and Magnetism" by Panofsky and Phillips, Addison-Wesley (1955), which text is incorporated by reference herein, the dispersion formula for the index of refraction n of a dilute system of free electrons, such as plasma 22, in terms of radiation angular frequency f, is $$n = (1 - Ne^2/bmf^2)^{\frac{1}{2}}$$

where N, e, and m are the free electron density, the electron charge, and the electron mass, respectively, and b is a constant equal to $10^7/4\pi c^2$ farads per meter. The dispersion formula makes it clear that as ultraviolet or X-ray laser pulse 12 passes through plasma 22 it will always be at locations where the index of refraction is less than one, or expressed equivalently, at locations where the phase or wave velocity of laser pulse 12 is greater than c, the free-space velocity of light, since n is defined as the ratio of c to the phase velocity of an electromagnetic disturbance at a point in space. The dispersion formula also makes it clear, since the frequency f of the radiation of laser pulse 12 remains constant throughout the processes discussed herein, that n increases as N decreases. In other words, whenever a portion of laser pulse 12 moves into a region of plasma 22 that has a decreased free electron density, the phase velocity of electromagnetic radiation in that region is also decreased. According to elementary optics theory, electromagnetic radiation always propagates along lines that are at every point perpendicular to the electromagnetic wavefront. Consequently, whenever electromagnetic radiation propagates into a plasma across which there is a transverse gradient in free electron density, the direction of radiation propagation will bend into the direction of lower free electron density, because that is the direction of increasing index of refraction or, equivalently, decreasing phase velocity, and by bending into a region of lower phase velocity the radiation will continue to move in a direction perpendicular to the electromagnetic wavefront. This effect may be somewhat simplistically understood by visualizing a cart, or wagon, whose right wheels rotate somewhat slower than its left wheels, thereby causing the path of the cart to bend to the right. To summarize, in a plasma, X-rays and ultraviolet radiation are bent by index of refraction gradients away from regions of high free electron density, where the phase velocity of electromagnetic radiation is higher than in regions of lower electron density. Finally, it should be noted that refractive effects are greater in plasmas having increasingly higher free electron densities, because in such plasmas the index of refraction is increasingly less than one, and the phase velocity is increasingly greater than c.

With continued reference to FIG. 1, as the nanosecond time scale, ultraviolet or X-ray laser pulse 12 proceeds along the straight line 24 into the streaming plasma 22, pulse 24 is first increasingly refracted away from the flat surfaced portion 18 of target 16, as the free electron density profile of plasma 22 increases in steepness. This is indicated by a sweeping arrow 26 drawn through the ultraviolet or X-ray laser pulse 12 at a location positioned after refraction by the plasma 22. Then, as the free electron density profile of streaming plasma 22 gradually levels, as the intensity of high power laser pulse 20 decreases, the ultraviolet or X-ray laser pulse 12 is decreasingly refracted back toward straight line 24.

After it leaves the plasma 22, the refracted nanosecond time scale, ultraviolet or X-ray laser pulse 12 sweeps across a part of apparatus 10 comprising an opaque barrier 28 that has an aperture 30. The particular composition of barrier 28 is not critical to the performance of this invention, so long as barrier 28 is opaque to the ultraviolet or X-ray radiation that comprises laser pulse 12. As shown in FIG. 1, when laser pulse 12 leaves plasma 22 proceeding in a single direction, a portion of laser pulse 12 passes through aperture 30 and becomes shortened to an ultraviolet or X-ray laser pulse of short duration 32. Aperture 30 may be positioned at any location on the path that laser pulse 12 refractively sweeps across the surface of barrier 28, including the end points of that path. Note particularly that if aperture 30 is placed directly upon straight line 24, only the first portion of laser pulse 12 will pass through aperture 30.

The aperture 30 in opaque barrier 28 may be variously configured to acheive many beneficial experimental or practical advantages. However, aperture 30 may often preferably be configured as a slit, particularly a slit having a width of approximately 100 microns. In this case ultraviolet or X-ray laser pulse 32 may have a temporal pulse length as short as 1 picosecond.

Figure 2:
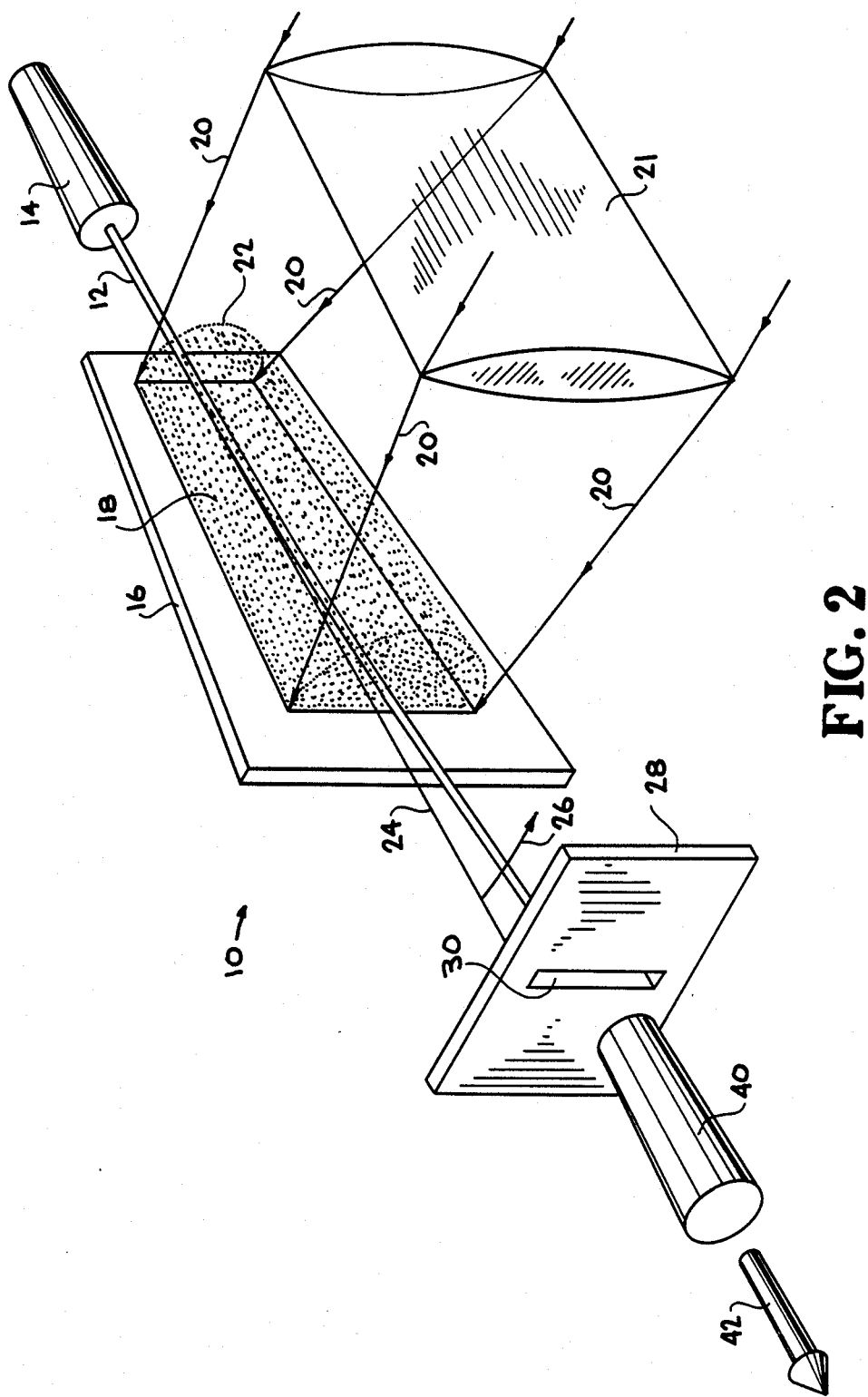
FIG. 2 is a schematic, perspective view of an apparatus for producing a high power ultraviolet or X-ray laser pulse having a temporal pulse length as short as a single picosecond.

Reference is now made to FIG. 2, which illustrates the method and apparatus for producing a high power ultraviolet or X-ray laser pulse of short duration of this invention. All the items of FIG. 2 that have a common reference numeral with items of FIG. 1 are exactly equivalent to those items as described above. FIG. 2 shows, in addition to the items shown in FIG. 1, an ultraviolet or X-ray laser gain medium 40. An ultraviolet or X-ray laser gain medium is defined herein to mean a collection of atoms and electrons so prepared that an incident wave of ultraviolet or X-ray laser radiation, having the frequency of the radiation comprising pulse 12, will stimulate more emission than absorption and undergo a net amplification in its passage therethrough. As discussed above in conjunction with the discussion of the means 14, for producing the ultraviolet or X-ray laser pulse 12, gain media such as ultraviolet or X-ray laser gain medium 40 are presently routinely produced at laboratories throughout the world, and their means of production are well documented in the literature. The references cited above for means 14 are equivalently relevant to gain medium 40. Gain medium 40 is positioned so that when an ultraviolet or X-ray laser pulse of short duration, such as laser pulse 32 of FIG. 1, passes through gain medium 40, the pulse is amplified and becomes a high power ultraviolet or X-ray laser pulse of short duration 42. When aperture 30 is configured as a slit having a width of approximately 100 microns, as discussed above, the ultraviolet or X-ray laser pulse 42 may have a temporal pulse length as short as 1 picosecond.

It is thus appreciated that in accordance with the invention as herein described and shown in FIGS. 1 and 2, a method and apparatus for producing ultraviolet or X-ray laser pulses having a duration as short as 1 picosecond, and especially high power ultraviolet or X-ray wavelength laser pulses having a duration as short as 1 picosecond, is provided.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, multiple apertures may be placed into the opaque barrier 28, resulting in the production of multiple shortened ultraviolet or X-ray laser pulses. Also, multiple short high power conventional laser pulses, such as conventional laser pulse 20, may be employed to separately deflect and separate out a string of short ultraviolet or X-ray laser pulses. Additionally, flat surfaced portion 18 of target 16, in addition to being comprised, potentially, of any solid structural material, may be comprised of variously supported liquid surfaces. The embodiment herein was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for shortening the duration of a nanosecond time scale, ultraviolet or X-ray laser pulse, the method comprising the steps of:

illuminating a flat surfaced portion of a target comprised of a solid structural material, the flat surfaced portion of the target having an areal density of $10^{-5}$ gm/cm$^2$ or greater, with a pulse of line focused, high power, laser radiation having a wavelength in the approximate range from 0.25 to 11 microns, having a full width at half maximum amplitude in the approximate range from 10 picoseconds to 1 nanosecond, and having a peak intensity of $10^{12}$ watts/cm$^2$ or greater, thereby producing a streaming plasma in a spatial region located generally along, but slightly removed outward from, the illuminated flat surfaced portion of the target, with the free electron density of the streaming plasma approximately exponentially decreasing in the direction perpendicularly proceeding away from the flat surfaced portion of the target, at first increasingly steeply and then gradually leveling, as the illuminating pulse of laser radiation at first increases and then diminishes in intensity;

directing the ultraviolet or X-ray laser pulse along a straight line passing axially through the spatial region within which the streaming plasma is produced, so that the ultraviolet or X-ray laser pulse is first increasingly refracted away from the flat surfaced portion of the target, as the free electron density profile of the streaming plasma increases in steepness, and is then decreasingly refracted back toward the straight line along which the ultraviolet or X-ray laser pulse is directed, as the free electron density profile of the streaming plasma gradually levels; and positioning an opaque barrier having an aperture at a spatial location that permits a portion of the ultraviolet or X-ray laser pulse, after leaving the spatial region within which the streaming plasma is produced, to pass through the aperture in the barrier and become an ultraviolet or X-ray laser pulse of shortened duration.

2. A method for shortening the duration of an ultraviolet or X-ray laser pulse, as recited in claim 1, wherein the aperture in the opaque barrier is a slit having a width of approximately 100 microns.

3. An apparatus for shortening the duration of a nanosecond time scale, ultraviolet or X-ray laser pulse, the apparatus comprising:

a target comprised of a solid structural material and having a flat surfaced portion, with the flat surfaced portion of the target having an areal density of $10^{-5}$ gm/cm$^2$ or greater;

means for illuminating the flat surfaced portion of the target with a pulse of line focused, high power laser radiation having a wavelength in the approximate range from 0.25 to 11 microns, having a full width at half maximum amplitude in the approximate range from 10 picoseconds to 1 nanosecond, and having a peak intensity of $10^{12}$ watts/cm$^2$ or greater, to thereby produce a streaming plasma in a spatial region located generally along, but slightly removed outward from, the illuminated flat surfaced portion of the target, with the free electron density of the streaming plasma approximately exponentially decreasing in the direction perpendicularly proceeding away from the flat surfaced portion of the target, at first increasingly steeply and then gradually leveling, as the illuminating pulse of laser radiation at first increases and then diminishes in intensity, and with the target being positioned so that the nanosecond time scale, ultraviolet or X-ray laser pulse proceeds along a straight line passing axially through the spatial region within which the streaming plasma is produced, whereby the ultraviolet or X-ray laser pulse is first increasingly refracted away from the flat surfaced portion of the target, as the free electron density profile of the steaming plasma increases in steepness, and is then decreasingly refracted back toward the straight line along which the ultraviolet or X-ray laser pulse originally proceeds, as the free electron density profile of the streaming plasma gradually levels; and an opaque barrier having an aperture, and being positioned so that a portion of the nanosecond time scale, ultraviolet or X-ray laser pulse, after leaving the spatial region within which the streaming plasma is produced, passes through the aperture in the barrier and becomes an ultraviolet or X-ray laser pulse of shortened duration.

4. An apparatus for shortening the duration of a nanosecond time scale, ultraviolet or X-ray laser pulse, as recited in claim 3, wherein the aperture in the opaque barrier is a slit having a width of approximately 100 microns.

5. A method for producing a high power ultraviolet or X-ray laser pulse of short duration, the method comprising the steps of:

providing a nanosecond time scale, ultraviolet or X-ray laser pulse;

illuminating a flat surfaced portion of a target comprised of a solid structural material, the flat surfaced portion of the target having an areal density of $10^{-5}$ gm/cm$^2$ or greater, with a pulse of line focused, high power, laser radiation having a wavelength in the approximate range from 0.25 to 11 microns, having a full width at half maximum amplitude in the approximate range from 10 picoseconds to 1 nanosecond, and having a peak intensity of $10^{12}$ watts/cm$^2$ or greater, thereby producing a streaming plasma in a spatial region located generally along, but slightly removed outward from, the illuminated flat surfaced portion of the target, with the free electron density of the streaming plasma approximately exponentially decreasing in the direction perpendicularly proceeding away from the flat surfaced portion of the target, at first increasingly steeply and then gradually leveling, as the illuminating pulse of laser radiation at first increases and then diminishes in intensity;

directing the nanosecond time scale, ultraviolet or X-ray laser pulse along a straight line passing axially through the spatial region within which the streaming plasma is produced, so that the nanosecond time scale, ultraviolet or X-ray laser pulse is first increasingly refracted away from the flat surfaced portion of the target, as the free electron density profile of the streaming plasma increases in steepness, and is then decreasingly refracted back toward the straight line along which the nanosecond time scale ultraviolet or X-ray laser pulse is directed, as the free electron density profile of the streaming plasma gradually levels;

positioning an opaque barrier having an aperture at a spatial location that permits a portion of the nanosecond time scale, ultraviolet or X-ray laser pulse, after leaving the spatial region within which the streaming plasma is produced, to pass through the aperture in the barrier and become an ultraviolet or X-ray laser pulse of short duration; and preparing an ultraviolet or X-ray laser gain medium, with the gain medium being positioned in the path of the ultraviolet or X-ray laser pulse of short duration, whereby as the ultraviolet or X-ray laser pulse of short duration passes through the gain medium it becomes amplified and thereby becomes said high power ultraviolet or X-ray laser pulse of short duration.

6. A method for producing a high power ultra-violet or X-ray laser pulse of short duration, as recited in claim 5, wherein the aperture in the opaque barrier is a slit having a width of approximately 100 microns.

7. An apparatus for producing a high power ultraviolet or X-ray laser pulse of short duration, the apparatus comprising:

means for providing a nanosecond time scale, ultraviolet or X-ray laser pulse;

a target comprised of a solid structural material and having a flat surfaced portion, with the flat surfaced portion of the target having an areal density of $10^{-5}$ gm/cm$^2$ or greater;

means for illuminating the flat surfaced portion of the target with a pulse of line focused, high power laser radiation having a wavelength in the approximate range from 0.25 to 11 microns, having a full width at half maximum amplitude in the approximate range from 10 picoseconds to 1 nanosecond, and having a peak intensity of $10^{12}$ watts/cm$^2$ or greater, to thereby produce a streaming plasma in a spatial region located generally along, but slightly removed outward from, the illuminated flat surfaced portion of the target, with the free electron density of the streaming plasma approximately exponentially decreasing in the direction perpendicularly proceeding away from the flat surfaced portion of the target, at first increasingly steeply and then gradually leveling, as the illuminating pulse of laser radiation at first increases and then diminishes in intensity, and with the target being positioned so that the nanosecond time scale, ultraviolet or X-ray laser pulse proceeds along a straight line passing axially through the spatial region within which the streaming plasma is produced, whereby the nanosecond time scale, ultraviolet or X-ray laser pulse is first increasingly refracted away from the flat surfaced portion of the target, as the free electron density profile of the streaming plasma increases in steepness, and is then decreasingly refracted back toward the straight line along which the nanosecond time scale, ultraviolet or X-ray laser pulse originally proceeds, as the free electron density profile of the streaming plasma gradually levels;

an opaque barrier having an aperture, and being positioned so that a portion of the nanosecond time scale, ultraviolet or X-ray laser pulse, after leaving the spatial region within which the streaming plasma is produced, passes through the aperture in the barrier and becomes an ultraviolet or X-ray laser pulse or short duration; and means for preparing an ultraviolet or X-ray laser gain medium, with the gain medium being positioned in the path of the ultraviolet or X-ray laser pulse of short duration, whereby as the ultraviolet or X-ray laser pulse of short duration passes through the gain medium it becomes amplified and thereby becomes said high power ultraviolet or X-ray laser pulse of short duration.

8. An apparatus for producing a high power ultraviolet or X-ray laser pulse of short duration, as recited in claim 7, wherein the aperture in the opaque barrier is a slit having a width of approximately 100 microns.

* * * * *